United States Patent [19]
Nakajima

[11] Patent Number: 5,493,446
[45] Date of Patent: Feb. 20, 1996

[54] PROJECTION LENS

[75] Inventor: Masaya Nakajima, Yokohama, Japan

[73] Assignee: Nikon Corporation, Tokyo, Japan

[21] Appl. No.: 312,679

[22] Filed: Sep. 28, 1994

Related U.S. Application Data

[63] Continuation of Ser. No. 116,761, Sep. 7, 1993, abandoned.

[30] Foreign Application Priority Data

Jun. 14, 1993 [JP] Japan ..................................... 5-141855

[51] Int. Cl.$^6$ .............................. G02B 3/00; G02B 13/18
[52] U.S. Cl. .......................... 359/650; 359/715; 359/771; 359/780
[58] Field of Search ..................................... 359/649–650, 359/713–715, 771, 780, 772, 760, 768

[56] References Cited

U.S. PATENT DOCUMENTS

| | | | |
|---|---|---|---|
| 4,620,773 | 11/1986 | Fukuda | 359/650 |
| 4,682,861 | 7/1987 | Hosoya | 359/650 |
| 4,699,476 | 10/1987 | Clarke | 359/780 |
| 4,707,084 | 11/1987 | Betensky | 359/650 |
| 4,755,028 | 7/1988 | Moskovich | 359/771 |
| 4,770,513 | 9/1988 | Fujie et al. | 359/708 |
| 4,776,681 | 10/1988 | Moskovich | 359/650 |
| 4,884,879 | 12/1989 | Fukuda et al. | 359/650 |
| 4,950,062 | 8/1990 | Kimura et al. | 359/650 |
| 5,066,113 | 11/1991 | Nakajima et al. | 359/708 |

FOREIGN PATENT DOCUMENTS

| | | | |
|---|---|---|---|
| 3-39916 | 2/1991 | Japan | 359/649 |
| 3-75711 | 3/1991 | Japan . | |
| 4-254814 | 9/1992 | Japan . | |

*Primary Examiner*—James Phan
*Attorney, Agent, or Firm*—Shapiro and Shapiro

[57] ABSTRACT

A projecting lens for projecting the image of an object onto a screen comprising, in the order from the screen side, a first lens group of a positive refractive power; a cemented second lens group of a positive refractive power; a third lens group of a negative refractive power; and a fourth lens group of a positive refractive power with a concave surface at the screen side; wherein each of the first and third lens group has at least an aspherical face, and the focal length f of the projecting lens, the focal length f1 of the first lens group and the focal length f3 of the third lens group satisfy conditions: $0 < f/f1 < 0.25$ and $-0.1 < f/f3 < 0$.

16 Claims, 6 Drawing Sheets

PROJECTION LENS

This is a continuation of application Ser. No. 08/116,761 filed Sep. 7, 1993, now abandoned.

BACKGROUND OF THE INVENTION

1. Field of the Invention

The present invention relates to a projection lens, and more particularly to a projection lens for use in a video projector for projecting the image of a cathode ray tube for obtaining a large image.

2. Related Background Art

Video projectors are recently becoming popular as a method of obtaining a large television reproduced image, and the performance of the projection lens plays an important role in securing the quality of the reproduced image. There are required a large aperture ratio for obtaining a brighter projected image, and a wide image angle in order to reduce the distance from the image plane of the cathode ray tube and to achieve a compact depth of the cabinet of the projection apparatus.

In such video projector, there are generally required three projection lenses corresponding to three cathode ray tubes of blue (B), green (G) and red (R), and various projection lenses employing aspherical plastic lenses have been proposed in order to meet such highly advanced requirements while reducing the dimension, weight and cost of the lens.

In the conventional projection lenses, it has been difficult to obtain a clear color image, because of a chromatic aberration in the image synthesized on the screen, resulting from high-order distortion. An improvement on this drawback is proposed, for example, by a projection lens disclosed in the U.S. Pat. No. 5,066,113 corresponding to the Japanese Patent Laid-Open Application No. 3-75711. This projection lens shows satisfactory correction of the high-order distortion, but is unsuitable for mass projection and unfavorable in cost, as the aspherical plastic lens is extremely thick. Besides it is associated with a drawback of significant deterioration of the performance, when subjected to a variation in ambient conditions such as temperature and humidity.

SUMMARY OF THE INVENTION

The object of the present invention is to provide a projection lens which realizes a high magnification of projection while achieving a large aperture and a large image angle, also exhibits well-balanced satisfactory imaging performance through the correction not only of the high-order distortion but also of the chromatic aberration, can furthermore withstand the variation in the ambient conditions such as temperature and humidity and can be manufactured with a low cost.

The foregoing object can be attained, according to the present invention, by a projection lens consisting, in the order from the screen side, of a first lens group G1 of a positive refractive power, a biconvex-shaped second lens group G2 of a positive refractive power, a third lens group G3 of a weak refractive power, and a fourth lens group G4 of a negative refractive power with a concave face at the screen side, wherein the first lens group G1 and the third lens group G3 have at least an aspherical face, and the lens satisfies following conditions:

(1) $0 < f/f1 < 0.25$ (2) $-0.1 < f/f3 < 0.3$ wherein f is the focal length of the entire lens system, f1 is the focal length of the first lens group G1, and f3 is the focal length of the third lens group.

The first lens group G1 is composed of a first lens component of a positive meniscus lens shape convex to the screen, a second lens component of a negative meniscus lens shape convex to the screen, and third lens component of an aspherical plastic lens of a meniscus lens shape convex to the screen, and preferably satisfies a condition:

(3) $0 < f/f_{as1} < 0.25$ wherein $f_{as1}$ is the paraxial focal length of the third lens component.

Also the third lens group G3 is preferably composed of an aspherical plastic lens component L31 of a meniscus lens shape convex to the screen.

The first lens group G1 has functions for correcting the spherical aberration and the coma, while the second lens group G2 serves for the principal imaging function, and the third lens group G3 functions for satisfactorily correcting the distortion and the coma. The fourth lens group G4 serves as a field flattener having the function of correcting the Petzval's sum, namely the image plane curvature and the astigmatism.

In order that the first lens group G1 has sufficient correcting function for the spherical aberration and the coma in the above-explained configuration, the first lens group G1 is preferably provided with an appropriate refractive power, and this condition is defined by the above-mentioned relation (1).

Above the upper limit of said condition (1), the first lens group G1 shows an excessively strong refractive power, thus generating a significant coma, whereby the large image angle becomes difficult to achieve and the distortion becomes larger in the positive side. On the other hand, below the lower limit of the condition (1), the first lens group G1 has a negative refractive power, whereby the refractive power of the second lens group G2 for imaging is given an excessive burden, and the spherical aberration becomes difficult to correct. As a result, an enough amount of light cannot be secured, and the lens dimension becomes larger.

Also for satisfactorily correcting the distortion and the coma, the third lens group G3, contributing to the correction of these aberrations, should be given an appropriate refractive power. The above-mentioned condition (2) is provided for defining an appropriate refractive power for the third lens group G3. Above the upper limit of said condition (2), the third lens group G3 has a positive refractive power. Thus, for maintaining the Petzval's sum at a satisfactory level, the fourth lens group G4 has to be given a strong refractive power, whereby the coma becomes enhanced for a ray of a large image height, and the distortion exhibits a stronger curvature. On the other hand, below the lower limit of the condition (2), the third lens group G3 shows a stronger negative refractive power, thus giving a large burden on the refractive power of the second lens group G2 for imaging function, and the spherical aberration cannot be corrected satisfactorily.

For realizing an inexpensive aspherical lens, the use of a plastic material is extremely useful. However, such plastic lens is already known to exhibit significant variations in the refractive index and the shape in response to a variation in temperature. Since the video projectors are generally used under harsh ambient conditions involving large temperature changes, a temperature compensation is required in order to prevent the deterioration of the optical performance resulting from temperature change. The use of a plastic lens with a weak refractive power allows to prevent the variation of the image plane extremely satisfactorily, by compensating the variation in the focal length resulting from the variations in the refractive power and the shape of the plastic lens itself caused by the temperature change, by the variation in the focal length of the projection lens itself caused by the temperature change. Otherwise the aspherical plastic lens is preferably made free of refractive power as far as possible and given a shape for mainly correcting the higher-order aberrations, in order to achieve temperature compensation in the correction of aberrations.

Thus, for satisfactorily correcting the image plane variation and the aberrations resulting from temperature change, it is more preferable to balance the two.

Therefore, for correcting the variation in the focal length of the projection lens itself resulting from the temperature change, there is defined the above-mentioned condition (3), which defines an appropriate refractive index in the paraxial area of the aspherical plastic lens component L31 in the third lens group. Outside the range of said condition (3), the image plane displacement becomes large due to the variation in the refractive index and the shape of the plastic material resulting from temperature change. More specifically, above the upper limit of the condition (3), the correction for the spherical aberration becomes deficient, and the correction for the coma becomes unbalanced. On the other hand, below the lower limit of the condition (3), the spherical aberration becomes excessively corrected, and there is generated a significant coma, because the diverging effect on an oblique ray increases whereby such oblique ray passes the second lens group G2 at a larger height from the optical axis.

As explained above, the present invention provides a projection lens which realizes a high magnification of projection while achieving a large aperture and a wide image angle, which also exhibits an extremely satisfactory imaging performance through the correction not only of the high-order distortion but also of the chromatic aberration, which furthermore can withstand the variation in ambient conditions such as temperature and humidity, and which can be manufactured with a low cost.

Thus the projection apparatus can be realized in a compact configuration. Besides, because the high-order curvature of the distortion is satisfactorily corrected despite of the wide image angle, in a three-tube projection apparatus, the variation in the image magnification resulting from fan-shape effect can be easily corrected by a variation in the scanning magnification of the cathode ray tubes. Thus the images of three tubes of blue, green and red can be precisely superposed even in the peripheral areas, and a shape color projected image without color blotting can be obtained.

In the basic configuration of the present invention explained above, if the third lens group G3 has a negative focal length, namely within a range:

(2-1) $-0.1 < f/f3 < 0$ there are preferably satisfied following additional conditions, within the first lens group, among the radii of curvature of a face RA closest to the screen and a face RB closest to the object of the first lens component, and those of a face RC closest to the screen and a face RD closest to the object of the second lens component:

(4) $2 < (RB+RA)/(RB-RA) < 5$ (5) $-5 < (RD+RC)/(RD-RC) < -2$

The relations (4) and (5) represent conditions, in an optical system with a wide image angle and a large aperture, for passing a ray of a large image angle without difficulty and suppressing the off-axis aberrations. Above the upper limit of the condition (4), the correction of the spherical aberration becomes deficient, and, below the lower limit of the condition (4), the spherical aberration is excessively corrected.

Also above the upper limit of the condition (5), the correction of the spherical aberration becomes deficient, and there is generated a significant coma at a large image angle. Also below the lower limit of the condition (5), the spherical aberration is excessively corrected.

For satisfactory correction of the chromatic aberration, the second lens group G2 is preferably composed of an adhered lens consisting of a positive lens L21 and a negative lens L22. More specifically, the second lens group is composed of a biconvex positive lens component and a negative meniscus lens component and preferably satisfies a relation:

(6) $0.5 < (N12-N11)/(N22-N21) < 1.2$ wherein N21 and N22 are the refractive index respectively of the positive and negative lens components, and N11 and N12 are the refractive index respectively of the first and second lens components in the first lens group.

Outside the range of the condition (6), the correction of the chromatic aberration by the positive meniscus lens L11 and the negative meniscus lens L12 in the first lens group and that by the adhered lens in the second lens group become unbalanced, so that the correction of the transverse chromatic aberration becomes difficult if priority is given to the correction of the axial chromatic aberration.

For defining the appropriate position for the third lens group, a condition:

(7) $0.14 < D23/f2 < 0.2$ is effective, wherein f2 is the focal length of the second lens group G2, and $D_{23}$ is the axial air gap between the second and third lens groups. Above the upper limit of the condition (7), the coma becomes difficult to correct, and, below the lower limit, the correction of the astigmatism becomes deficient.

Furthermore, the third lens group G3 preferably satisfies a condition:

(8) $-100 < (RF+RE)/(RF-RE) < -20$ wherein RE and RF are radii of curvature respectively of a face closest to the screen and a face closest to the object, of the meniscus lens component L31 in the third lens group G3.

The condition (8) defines the shape of the aspherical plastic lens in the third lens group G3 for minimizing the refractive power of said aspherical plastic lens thereby achieving temperature compensation in the correction of aberrations and also correcting the aberrations of higher orders. Thus the condition (8) defines the shape of the third lens group as a meniscus shape convex to the screen. Above the upper limit of the condition (8), the distortion is corrected only deficiently. On the other hand, below the lower limit of the condition (8), a wide image angle cannot be achieved because of an excessive correction of the distortion and a significant outward coma.

On the other hand, in case the third lens group has a positive focal length f3, namely in case of:

(2—2) $0 < f/f3 < 0.3$ the first and second lens components in the first lens group preferably satisfy following conditions:

(9) $5 < (RB+RA)/(RB-RA) < 12$

(10) $-7 < (RD+RC)/(RD-RC) < -5.1$

Also for correcting the variation in the image plane resulting from temperature change while compactizing the lens system, there is more preferably satisfied a condition:

(11) $0.1 < d_{L13}/D1 < 0.25$ wherein $d_{L13}$ is the axial thickness of the aspherical plastic lens component L13 in the first lens group G1, and D1 is the axial thickness of the first lens group.

Above the upper limit of the condition (11), the lens system cannot be compactized. Also in case a wide image angle is desired as in the present invention, it becomes difficult to balance the variation of the focal length of the plastic lens resulting from the temperature variation with the variation of the optimum image plane caused by the variation in the lens shape resulting from the temperature variation, whereby the excellent imaging performance becomes difficult to maintain. On the other hand, below the lower limit of the condition (11), the lens manufacture becomes more difficult so that the cost reduction becomes difficult to achieve.

The first lens group G1 has the functions of satisfactorily correcting the spherical aberration and coma, and for the purpose of achieving well-balanced correction of the aberrations of the entire lens system and compactizing the entire projection lens system while maintaining the sufficient correcting function in the first lens group G1, there is more preferably satisfied a condition:

(12) $0.9 < D_{12}/D_{24} < 1.5$ wherein $D_{12}$ is the axial distance from the axial point of a lens face, closest to the screen, of the first lens group G1 to the axial point of a lens face, closest to the screen, of the second lens group G2, and $D_{24}$ is the axial distance from the axial point of a lens face, closest to the object, of the second lens group G2 to the axial point of a lens face, closest to the screen, of the fourth lens group G4.

Below the lower limit of the condition (12), the first lens group G1 is positioned close to the second lens group G2, so that the astigmatism and the coma become difficult to correct. On the other hand, above the upper limit of the condition (12), the lens system will have an extremely large length, thus becoming excessive in the dimension and weight.

Also for satisfactorily correcting the coma and other aberrations while maintaining a sufficient amount of light in the projection lens of the present invention, there is more preferably satisfied a condition:

(13) $0.15 < d_{12}/f < 0.4$ where $d_{12}$ the air gap between the first lens group G1 and the second lens group G2, and f is the focal length of the entire lens system.

Below the lower limit of the condition (13), the air gap between the first and second lens groups becomes narrower, whereby the sagittal coma becomes larger and extremely difficult to correct. On the other hand, above the upper limit of the condition (13), the air gap between the first and second lens groups becomes wider, whereby the peripheral light amount becomes difficult to secure. For circumventing this drawback, the lens system has to be made undesirably large. Besides, there will be generated a significant coma, as the oblique ray will have a larger entrance height in passing the second lens group G2.

For satisfactory correction of the chromatic aberration, the second lens group G2 is preferably provided with an adhered lens, consisting of a positive lens L21 and a negative lens L22. For fully exploiting the color correcting effect of said adhered lens, there is more preferably satisfied a condition:

(14) $25 < v_{L11} - v_{L12} < 36$ wherein $v_{L11}$ is the Abbe's number, for the e-line ($\lambda = 546.1$ nm), of the positive meniscus lens component L11 convex to the screen in the first lens group, and $v_{L12}$ is the Abbe's number, for the e-line ($\lambda = 546.1$ nm), of the negative meniscus lens component L12 convex to the screen in the first lens group.

Outside the range of said condition (13), the correction of the chromatic aberration by the positive meniscus lens component L11 and the negative meniscus lens component L12 in the first lens group is no longer balanced with the correction of the chromatic aberration by the adhered lens in the second lens group, so that the transverse chromatic aberration becomes difficult to correct if priority is given to the correction of the axial chromatic aberration.

Also, for achieving a satisfactory balance of the aberrations in the entire projection lens system, there is more preferably satisfied a condition:

(15) $n_{L22} - n_{L21} > 0.15$ wherein $n_{L21}$ and $n_{L22}$ are refractive indexes, for the e-line ($\lambda = 546.1$ nm), respective of the positive lens L21 and the negative lens L22 constituting the adhered lens in the second lens group G2.

This condition (15) is to satisfactorily correct the spherical aberration and coma, and, outside the range of said condition (15), particularly the outward coma becomes extremely difficult to correct.

DESCRIPTION OF THE PREFERRED EMBODIMENTS

Figure 1:
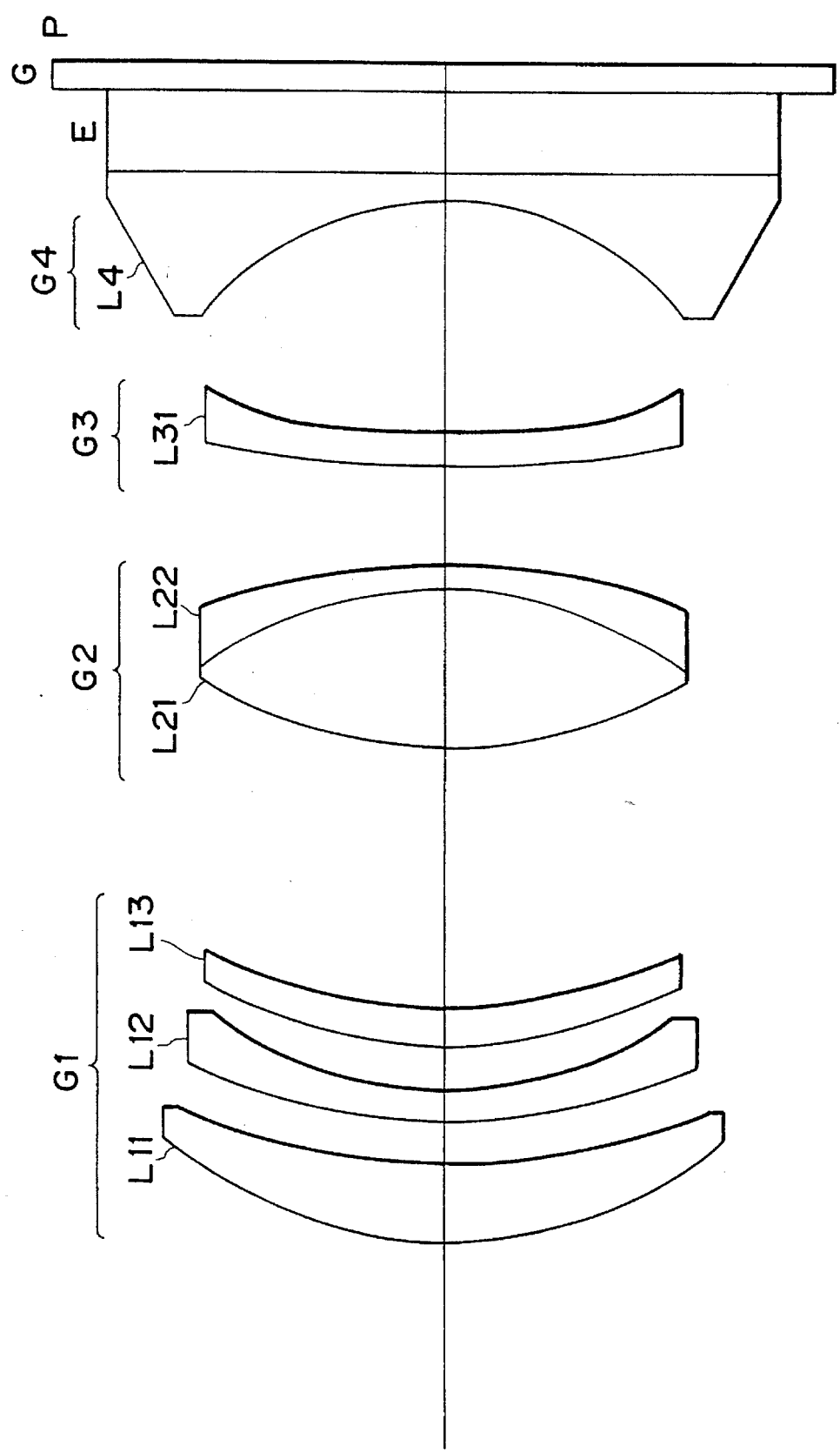
FIG. 1 is a view showing the lens configuration of an embodiment 1 of the present invention.

FIG. 1 is a view showing the lens configuration of an embodiment 1 of the present invention. The lens configuration of an embodiment 2 is not illustrated as it is same as shown in FIG. 1. The embodiments 1 and 2 shown in FIG. 1 show a case in which the third lens group G3 has a negative focal length.

In the following there will be given a detailed description on the 1st and 2nd embodiments, with reference to FIG. 1.

Either embodiment is composed, in the order from the screen, of a 1st lens group G1 of a positive refractive power consisting of a positive meniscus glass lens L11 convex to the screen, a negative meniscus glass lens L12 also convex to the screen, and a meniscus plastic lens L13 convex to the screen; a 2nd lens group G2 of a positive refractive power consisting of a biconvex positive glass lens L21 and a negative meniscus glass lens L22 convex to the object, adhered to said lens L21; a 3rd lens group G3 of a negative refractive power consisting of an aspherical meniscus plastic lens L31 convex to the screen; and a 4th lens group G4 of a negative refractive power consisting of a planoconcave negative glass lens L4 having the concave face at the screen side.

Behind these, there is provided a phosphorescent plane P constituting an object plane, across liquid (ethylene glycol) E and a glass face plate G constituting the front face of the cathode ray tube and composed of a substantially parallel-faced flat plate.

In either embodiment, the plastic lenses in the 1st lens group G1 and in the 3rd lens group G3 have aspherical faces on both sides. Each aspherical plastic lens has only a weak refractive power in the paraxial area, whereby the variation in the focal length resulting from the temperature change can be very advantageously compensated by the variation in the rear focal length of the entire lens system resulting from the temperature change, and the compensation of the imaging performance against the temperature change is therefore achieved.

Figure 4:
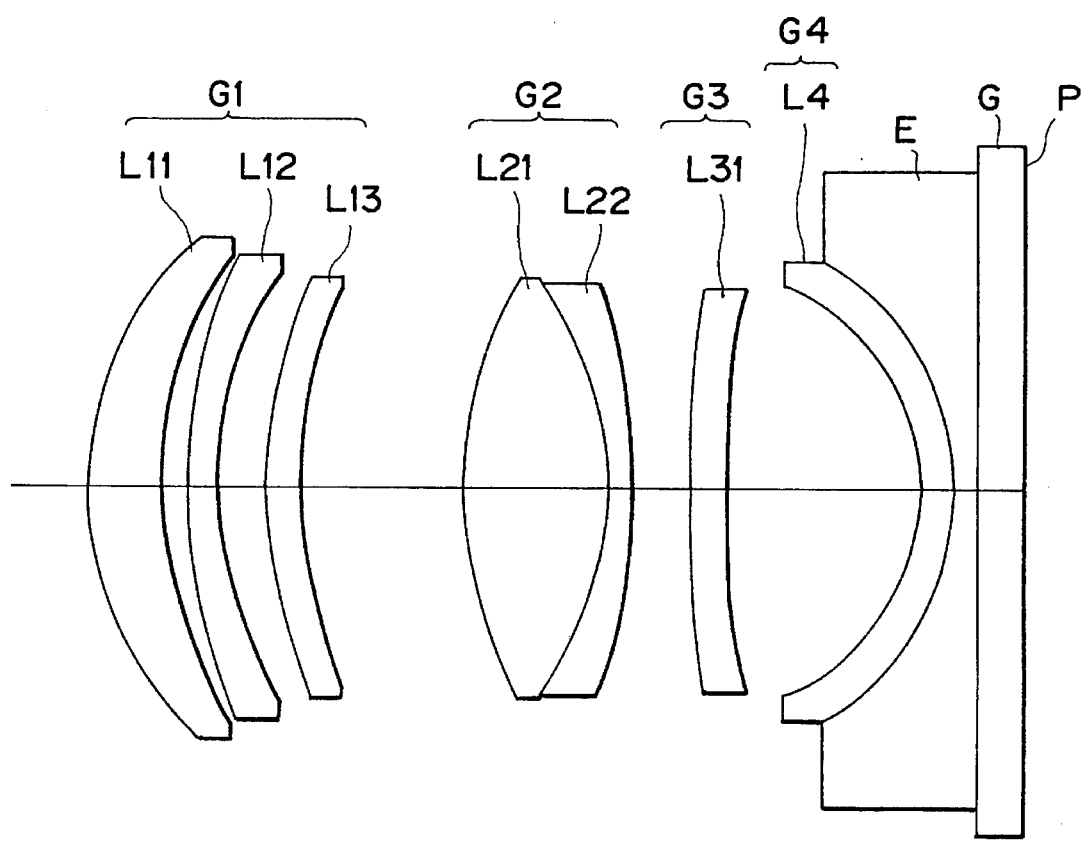
FIG. 4 is a view showing the lens configuration of an embodiment 3 of the present invention.

On the other hand, the 3rd and 4th embodiments, corresponding to a case in which the third lens group G3 has a positive focal length, have a lens configuration shown in FIG. 4.

In these 3rd and 4th embodiments, the plastic lenses in the 1st lens group G1 and in the 3rd lens group G3 have weak positive refractive powers in the paraxial area, whereby the variation in the focal length resulting from the temperature change can be advantageously compensated by the variation in the rear focal length of the entire lens system, resulting similarly from the temperature change.

The above-mentioned use of the aspherical plastic lenses in the 1st lens group G1 and in the 3rd lens group G3 is extremely advantageous in terms of correction of the aberrations and of manufacturing cost, and the 2nd lens group G2, having the largest refractive power in the entire system and thus having the imaging ability, is composed of glass lenses in order to minimize the deterioration of the performance resulting from the temperature change.

Also glass lenses are used in the lenses relating to the correction chromatic aberration, namely the positive meniscus lens L11 and the negative meniscus lens L12 in the 1st lens group G1, and the biconvex positive lens L21 and the negative meniscus lens L22 adhered thereto and convex to the object in the 2nd lens group G2, the increase of the chromatic aberration by the temperature change is advantageously reduced.

In the following there are shown parameters of the embodiments, wherein r1, r2, r3, . . . are the radii of curvature of lens faces, in the order from the screen side; d1, d2, d3, . . . are the axial thicknesses and the face distances of the lenses; n1, n2, n3, . . . are the refractive indexes of the lenses for the e-line λ=546.1 nm); ν1, ν2, ν3, . . . are the Abbe's numbers of the lenses for said e-line; f1, f2, . . . are the focal lengths of the lens groups; and f is the focal length of the entire system. The aspherical faces have a rotationally symmetrical shape defined by:

$$X=(C \cdot P^2)/\{1+(1-kC^2P^2)^{1/2}\}+A_2 P^2+A_4P^4+A_6P^6+A_8P^8+A_{10} +A_{12}P^{12} P=(Y^2+Z^2)^{1/2}$$

defined in an orthogonal coordinate system having the original point at the top of the lens face and the X-axis taken in the direction of optical axis, wherein C is the curvature at the top of the face, k is the conical constant and $A_2, A_4, A_6, A_8, A_{10}$ and $A_{12}$ are aspherical coefficients. These values are included in the following parameters.

Among these parameters, the asterisks (*) at the left-hand side of the lens face numbers indicate aspherical faces.

EMBODIMENT 1

Focal length f=171.5, aperture ratio 1:1.24, projection magnification 17.1, image angle 49.1°.

| | r | d | ν | n | |
|---|---|---|---|---|---|
| 1) | 110.6230 | 20.0000 | 61.19 | 1.591430 | $L_{11}$ |
| 2) | 174.6440 | 11.0000 | | 1.000000 | |
| 3) | 159.1450 | 8.0000 | 28.3 | 1.734317 | $L_{12}$ |

-continued

| | r | d | ν | n | |
|---|---|---|---|---|---|
| 4) | 101.5590 | 11.0000 | | 1.000000 | |
| *5) | 110.4800 | 10.0000 | 57.2 | 1.494160 | $L_{13}$ |
| *6) | 139.7000 | 66.0000 | | 1.000000 | |
| 7) | 122.3270 | 41.0000 | 61.1 | 1.591430 | $L_{21}$ |
| 8) | −103.4780 | 6.0000 | 28.3 | 1.734317 | $L_{22}$ |
| 9) | −184.6450 | 25.0000 | | 1.000000 | |
| *10) | 1250.0000 | 9.0000 | 57.2 | 1.494160 | $L_{31}$ |
| *11) | 1190.0000 | 57.9943 | | 1.000000 | |
| 12) | −80.5510 | 7.0000 | 36.3 | 1.624090 | $L_{41}$ |
| 13) | ∞ | 21.0000 | 56.3 | 1.415280 | E |
| 14) | ∞ | 7.0000 | 51.6 | 1.536040 | G |

Aspherical shape in the 5th face:
Conical constant: K=1.0000
Aspherical coefficients:
C2=0.00000
C4=−1.08000×10$^{-7}$
C6=9.13640×10$^{-12}$
C8=−1.27100×10$^{-14}$
C10=7.90000×10$^{-19}$ Aspherical shape in the 6th face:
Conical constant: K=1.0000
Aspherical coefficients:
C2=0.00000
C4=5.92770×10$^{-8}$
C6=1.86070×10$^{-11}$
C8=−1.12060×10$^{-14}$
C10=8.99999×10$^{-19}$ Aspherical shape in the 10th face:
Conical constant: K=1.0000
Aspherical coefficients:
C2=0.00000
C4=5.02510×10$^{-7}$
C6=3.97430×10$^{-12}$
C8=−1.29440×10$^{-14}$
C10=−6.60000×10$^{-19}$ Aspherical shape in the 11th face:
Conical constant: K=4.0000
Aspherical coefficients:
C2=0.00000
C4=7.08250×10$^{-7}$
C6=2.24250×10$^{-11}$
C8=−7.91350×10$^{-15}$
C10=−2.60000×10$^{-19}$ Numerical values corresponding to the conditions of the 1st embodiment:

(1) f/f1=0.161
(2) f/f3=−0.003
(3) f/fas1=0.1786
(4) (RB+RA)/(RB−RA)=4.456
(5) (RD+RC)/(RD−RC)=−4.527
(6) (N12−N11)/(N22−N21)=1
(7) D23/f2=0.176
(8) (RF+RE)/(RF−RE)=−40.7

EMBODIMENT 2

Focal length f=171.0, aperture ratio 1:1.24, projection magnification 17.1, image angle 49.2°.

| | r | d | ν | n | |
|---|---|---|---|---|---|
| 1) | 109.3024 | 20.0000 | 61.2 | 1.591420 | $L_{11}$ |
| 2) | 183.8506 | 8.0000 | | 1.000000 | |
| 3) | 166.3703 | 8.0000 | 30.1 | 1.704440 | $L_{12}$ |
| 4) | 98.9127 | 14.0000 | | 1.000000 | |
| *5) | 110.1799 | 10.0000 | 57.2 | 1.49416 | $L_{13}$ |
| *6) | 141.3717 | 66.0000 | | 1.000000 | |
| 7) | 122.4549 | 41.0000 | 61.2 | 1.591420 | $L_{21}$ |
| 8) | −104.6500 | 6.0000 | 28.3 | 1.734320 | $L_{22}$ |
| 9) | −187.0275 | 25.0000 | | 1.000000 | |
| *10) | 900.0000 | 9.0000 | 57.2 | 1.49416 | $L_{31}$ |
| *11) | 880.0000 | 58.0000 | | 1.000000 | |
| 12) | −80.5510 | 7.0000 | 36.3 | 1.624090 | $L_{41}$ |
| 13) | ∞ | 21.0000 | 56.3 | 1.415280 | E |
| 14) | ∞ | 7.0000 | 51.6 | 1.536040 | G |

Aspherical shape of the 5th face:
Conical constant: K=1.0000
Aspherical coefficients:
  C2=0.00000
  C4=−1.35310×10$^{-7}$
  C6=−2.44880×10$^{-12}$
  C8=−1.25150×10$^{-14}$
  C10=9.00000×10$^{-19}$ Aspherical shape of the 6th face:
Conical constant: K=1.0000
Aspherical coefficients:
  C2=0.00000
  C4=2.10850×10$^{-8}$
  C6=5.74370×10$^{-12}$
  C8=−1.12730×10$^{-14}$
  C10=1.00000×10$^{-18}$ Aspherical shape of the 10th face:
Conical constant: K=1.0000
Aspherical coefficients:
  C2=0.00000
  C4=4.80460×10$^{-7}$
  C6=−7.58550×10$^{-12}$
  C8=−1.09610×10$^{-14}$
  C10=−7.25000×10$^{-19}$ Aspherical shape of the 11th face:
Conical constant: K=1.0000
Aspherical coefficients:
  C2=0.00000
  C4=6.91770×10$^{-7}$
  C6=1.02480×10$^{-11}$
  C8=−6.5140×10$^{-15}$
  C10=−2.60000×10$^{-19}$ Numerical values corresponding to the conditions of the embodiment 2:

(1) f/f1=0.163
(2) f/f3=−0.0018
(3) f/fas1=0.187
(4) (RB+RA)/(RB−RA)=3.932
(5) (RD+RC)/(RD−RC)=−3.932
(6) (N12−N11)/(N22−N21)=0.791
(7) D23/f2=0.176
(8) (RF+RE)/(RE−RE)=−89

In the following shown are parameters of the 3rd and 4th embodiments of the present invention, wherein symbols have the same meaning as in the foregoing.

EMBODIMENT 3

Focal length f=108.5, aperture ratio 1:1.1, projection magnification −12.0, image angle 57°.

| | r | d | ν | n | |
|---|---|---|---|---|---|
| 1 | 68.083 | 16.00 | 61.0 | 1.59142 | $L_{11}$ |
| 2 | 84.494 | 5.50 | | | |
| 3 | 113.923 | 6.50 | 28.1 | 1.73432 | $L_{12}$ |
| 4 | 77.172 | 10.50 | | | |
| *5 | 79.000 | 8.00 | 57.2 | 1.49416 | $L_{13}$ |
| *6 | 103.000 | 35.30 | | | |
| 7 | 83.204 | 32.00 | 60.1 | 1.62286 | $L_{21}$ |
| 8 | −68.099 | 5.00 | 25.9 | 1.79180 | $L_{22}$ |
| 9 | −123.717 | 12.90 | | | |
| *10 | 1617.389 | 8.00 | 57.2 | 1.49416 | $L_{31}$ |
| *11 | 5217.297 | 42.00 | | | |
| *12 | −45.715 | 7.00 | 58.2 | 1.53800 | $L_{41}$ |
| 13 | −54.500 | 5.00 | 57.4 | 1.43978 | E |
| 14 | ∞ | 10.30 | 59.5 | 1.54036 | G |
| 15 | ∞ | | | | |

Aspherical shape of the 5th face:
Conical constant: k=1.5
Aspherical coefficients:
  $A_2$=0
  $A_4$=−6.7143×10$^{-7}$
  $A_6$=1.5121×10$^{-10}$
  $A_8$=−6.8647×10$^{-14}$
  $A_{10}$=1.8000×10$^{-17}$ Aspherical shape of the 6th face:
Conical constant: k=1.0
Aspherical coefficients:
  $A_2$=0,
  $A_4$=1.2314×10$^{-7}$
  $A_6$=−8.0391×10$^{-11}$
  $A_8$=1.8875×10$^{-14}$
  $A_{10}$=8.0434×10$^{-18}$ Aspherical shape of the 10th face:
Conical constant: k=−1.5
Aspherical coefficients:
  $A_2$=0,
  $A_4$=7.3671×10$^{-7}$
  $A_6$=2.5630×10$^{-10}$
  $A_8$=−1.1477×10$^{-13}$
  $A_{10}$=−1.4000×10$^{-17}$ Aspherical shape of the 11th face:
Conical constant: k=2.0
Aspherical coefficients:
  $A_2$=10,
  $A_4$=1.2686×10$^{-6}$
  $A_6$=9.0796×10$^{-11}$
  $A_8$=7.3043×10$^{-14}$
  $A_{10}$=−7.1685×10$^{-18}$
  $A_{12}$=−1.9300×10$^{-20}$ Aspherical shape of the 12th face:
Conical constant: k=1.05
Aspherical coefficients:
  $A_2$=0,
  $A_4$=−7.1739×10$^{-7}$
  $A_6$=9.0143×10$^{-10}$
  $A_8$=−4.8903×10$^{-19}$
  $A_{10}$=1.5777×10$^{-16}$ f/f1=134, f/f3=0.023, (RB+RA)/(RB−RA)=9.30
(RD+RC)/(RD−RC)=−5.20, f/fas1=0.176,
$d_{L13}/D_1$=0.172, $D_{12}/D_{24}$=1.30, $d_{12}/f$=0.325, $v_{L11}-v_{L12}$=32.9 $n_{L22}-n_{L21}$=0.169

EMBODIMENT 4

Focal length f=108.6, aperture ratio 1:1.09, projection magnification −12.0, image angle 57.0°.

| | r | d | ν | n | |
|---|---|---|---|---|---|
| 1 | 69.830 | 16.00 | 57.9 | 1.62555 | $L_{11}$ |
| 2 | 86.104 | 3.50 | | | |
| 3 | 98.567 | 7.00 | 26.3 | 1.76859 | $L_{12}$ |
| 4 | 70.208 | 11.50 | | | |
| *5 | 80.000 | 9.50 | 57.2 | 1.49354 | $L_{13}$ |
| *6 | 102.000 | 33.80 | | | |
| 7 | 86.024 | 32.00 | 60.1 | 1.62286 | $L_{21}$ |
| 8 | −67.403 | 5.00 | 25.9 | 1.79180 | $L_{22}$ |
| 9 | −121.287 | 13.00 | | | |
| *10 | 480.000 | 9.00 | 57.2 | 1.49354 | $L_{31}$ |
| *11 | 960.367 | 41.40 | | | |
| *12 | −46.293 | 7.00 | 58.2 | 1.53800 | $L_{41}$ |
| 13 | −56.000 | 5.00 | 57.4 | 1.43978 | E |
| 14 | ∞ | 10.30 | 59.5 | 1.54036 | G |
| 15 | ∞ | | | | |

Aspherical shape of the 5th face:
Conical constant: k=1.5
Aspherical coefficients:
 $A_2=0$,
 $A_4=-7.6361\times10^{-10}$
 $A_6=-1.0433\times10^{-10}$
 $A_9=-9.0904\times10^{-14}$
 $A_{10}=1.8000\times10^{-17}$ Aspherical shape of the 6th face:
Conical constant: k=1.0
Aspherical coefficients:
 $A_2=0$,
 $A_4=-4.6865\times10^{-8}$
 $A_6=1.6763\times10^{-11}$
 $A_8=-5.7493\times10^{-14}$
 $A_{10}=2.9999\times10^{-17}$ Aspherical shape of the 10th face:
Conical constant: k=−2.5
Aspherical coefficients:
 $A_2=0$,
 $A_4=-4.6865\times10^{-8}$
 $A_6=1.6763\times10^{-11}$
 $A_8=-5.7493\times10^{-14}$
 $A_{10}=2.0000\times10^{-17}$ Aspherical shape of the 11th face:
Conical constant: k=2.0
Aspherical coefficients:
 $A_2=2.0$,
 $A_4=1.1356\times10^{-6}$ −06
 $A_6=2.3571\times10^{-10}$ E−10,
 $A_8=1.3995\times10^{-14}$ E−14
 $A_{10}=-3.5024\times10^{-18}$ E−18

Aspherical shape of the 12th face:
Conical constant: k=1.0
Aspherical coefficients:
 $A_2=0$,
 $A_4=-7.0769\times10^{-7}$
 $A_6=3.0544\times10^{-10}$
 $A_8=8.5688\times10^{-15}$
 $A_{10}=0$ f/f1=0.131, f/f3=0.056, (RB+RA)/(RB−RA)=9.58
(RD+RC)/(RD−RC)=−5.95, f/fas1=0.165
$d_{L13}/D_1$=0.20, $D_{12}/D_{24}$=1.282, $d_{12}/f$=0.311, $\nu_{L11}-\nu_{L12}$=31.5 $n_{L22}-n_{L21}$=0.169.

In the foregoing embodiments, the aspherical meniscus plastic lens L13 in the 1st lens group is so shaped that a face thereof at the screen side has a positive facial refractive power which progressively decreases from the axial position to the peripheral area, while a face thereof at the object side has a negative facial refractive power which progressively increases from the axial position to the peripheral area, in order to sufficiently correct the spherical aberration and coma of higher order, which cannot be sufficiently corrected by the positive and negative glass lenses positioned at the screen side.

Also the aspherical plastic lens L31 in the 3rd lens group is so shaped, on the faces thereof at the screen side and at the object side, that the negative facial refractive power increases progressively from the axial position to the peripheral area and rapidly in the peripheral area, thereby sufficiently correcting the distortion and coma of the higher order. The facial refractive power used herein is defined in a small area around an arbitrary point on a refractive face, by the difference or the deviation angle between the incident angle and the emergent angle of an arbitrary ray entering said point, and said facial refractive power is defined positive or negative respectively if the parallel rays entering the vicinity of said refractive point converge or diverge after the refraction.

Figure 2:
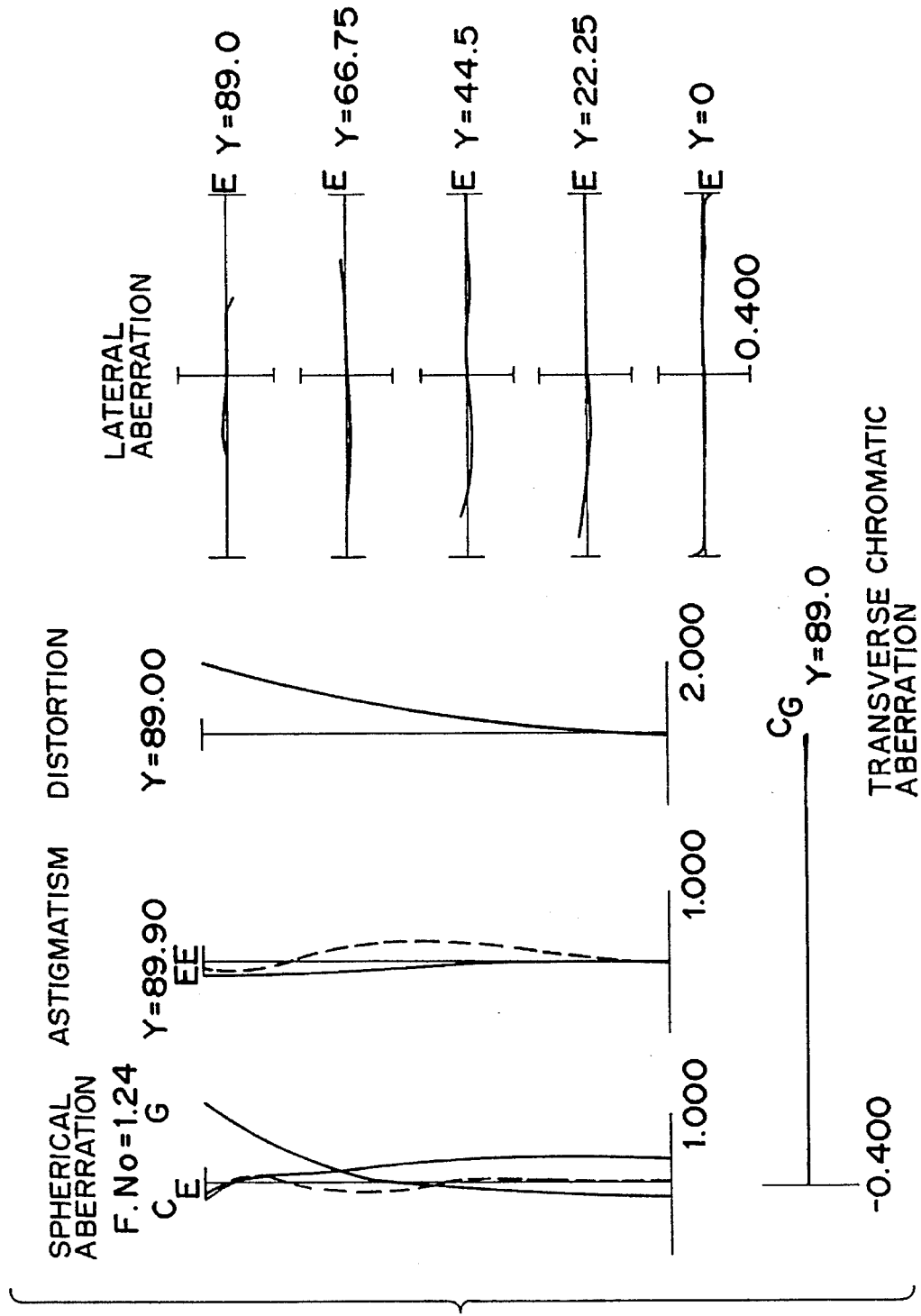
FIG. 2 is charts showing aberrations of the embodiment 1.
Figure 3:
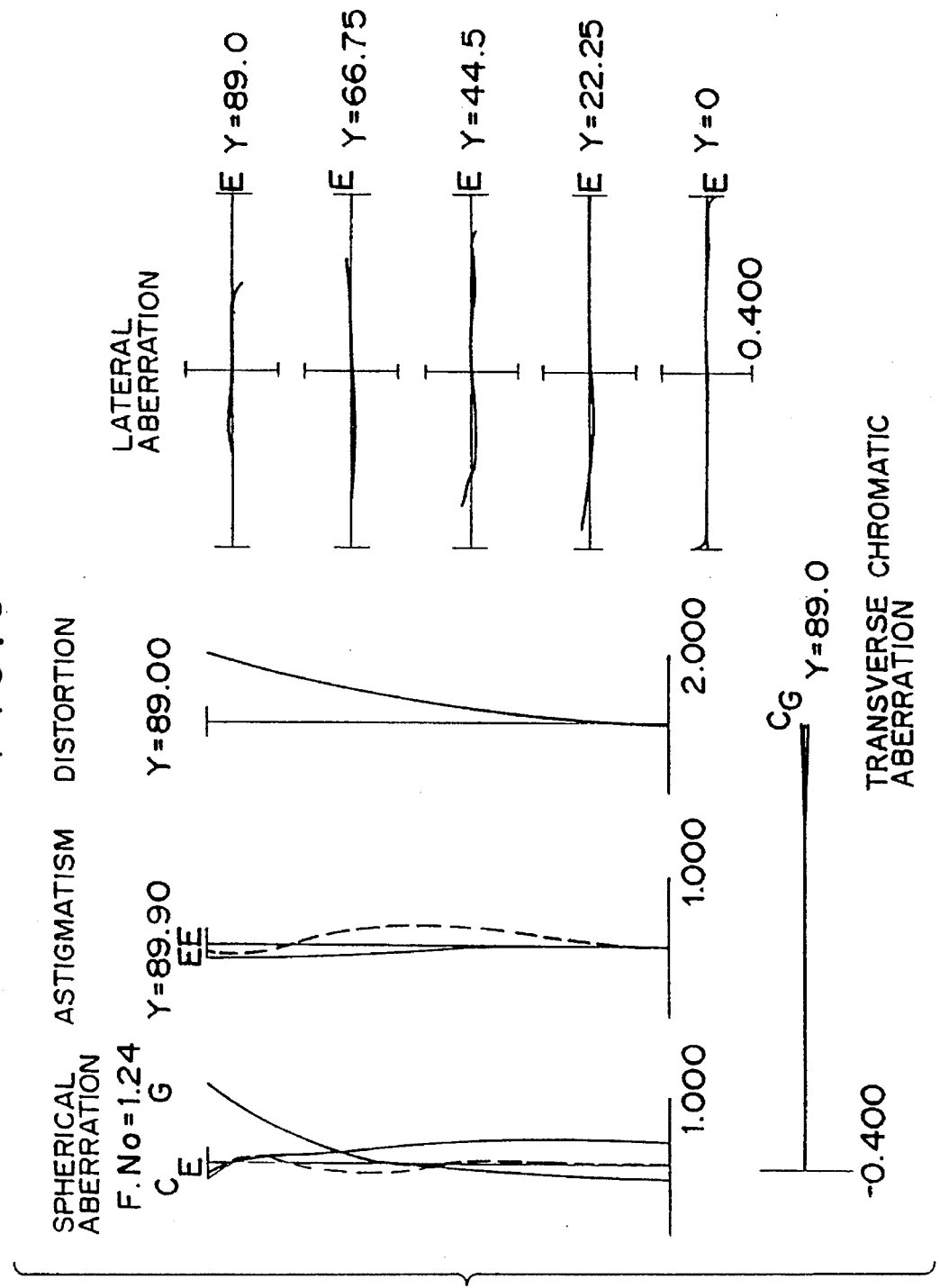
FIG. 3 is charts showing aberrations of an embodiment 2 of the present invention.
Figure 5:
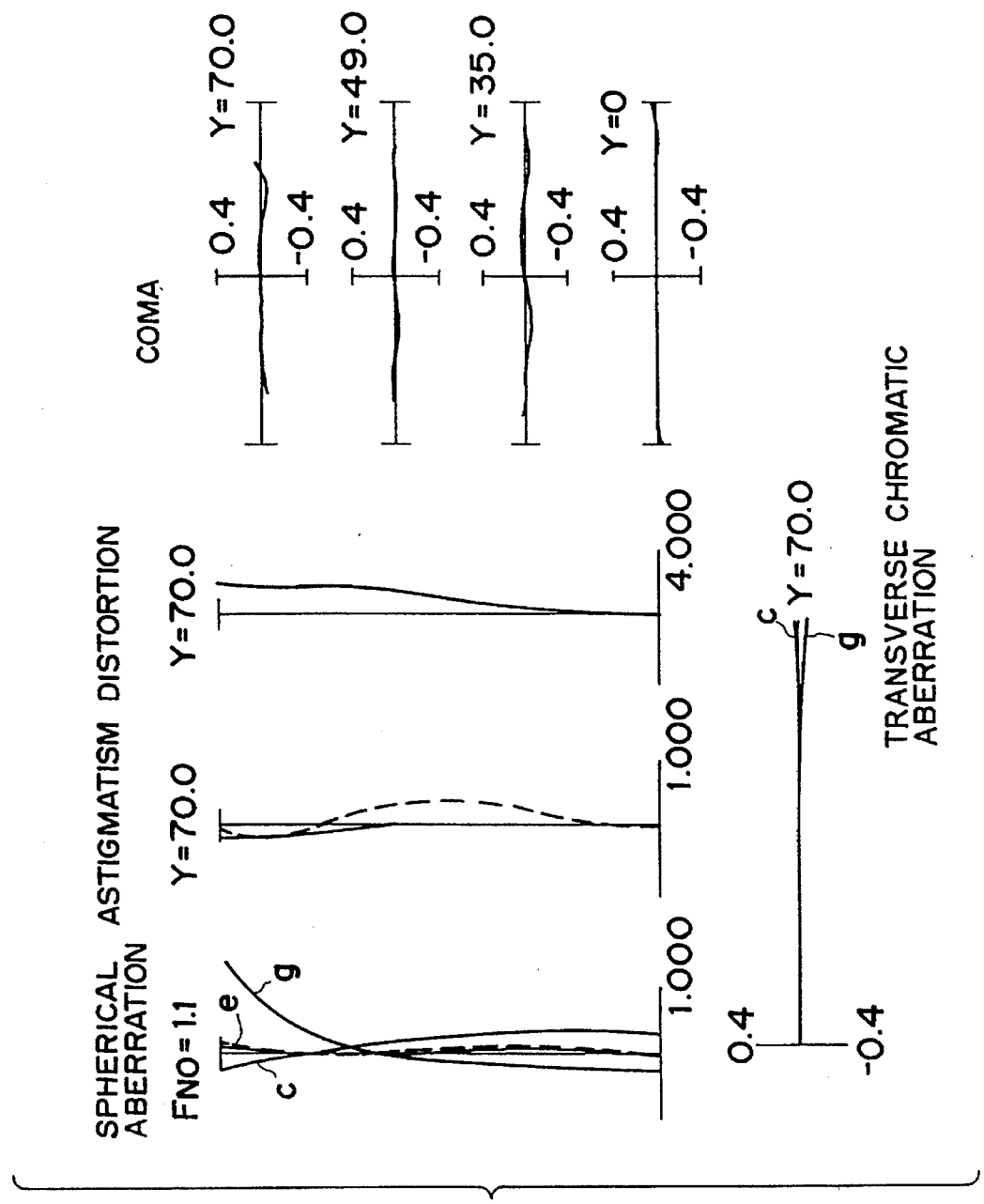
FIG. 5 is charts showing aberration of the embodiment 3.
Figure 6:
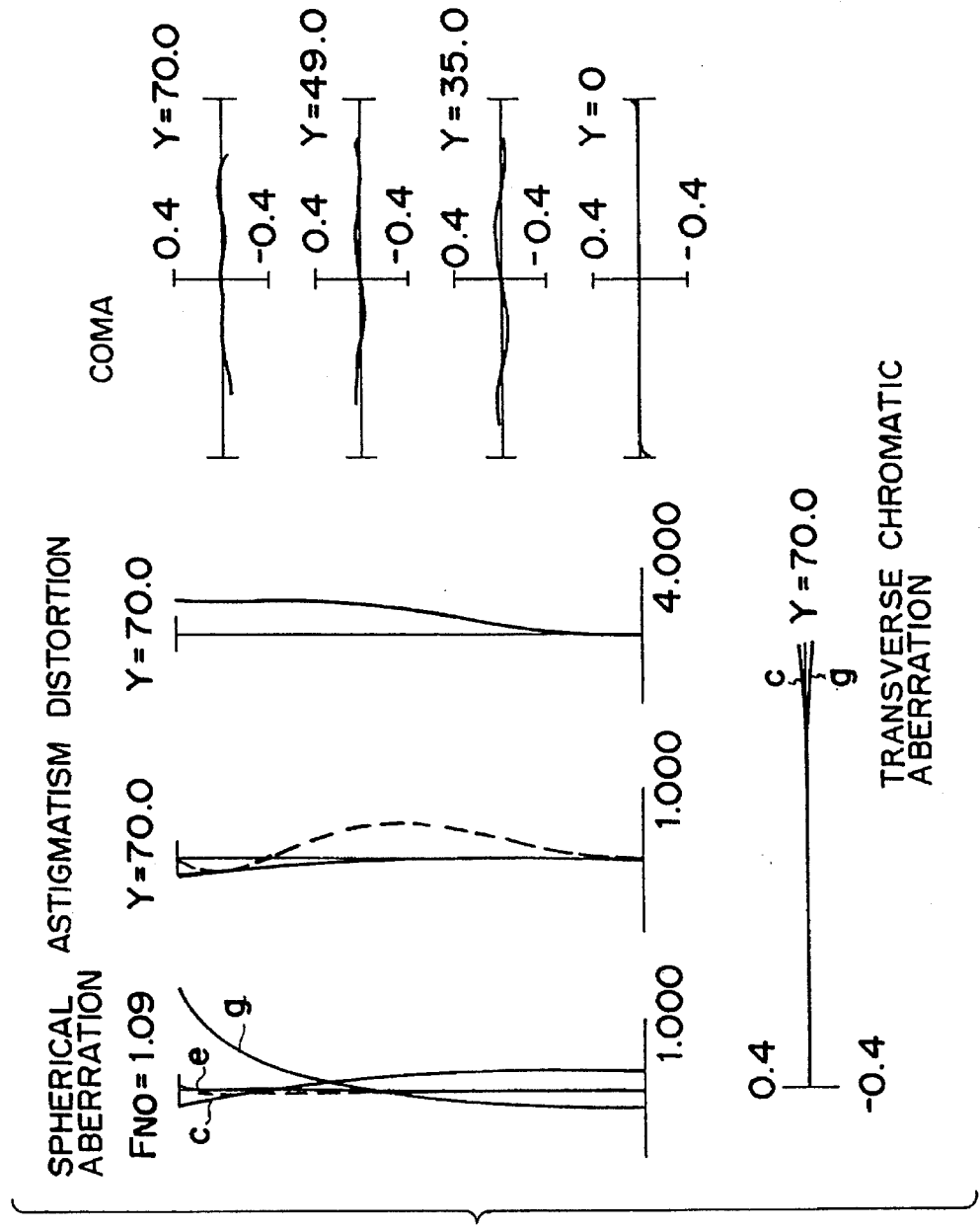
FIG. 6 is charts showing aberration of an embodiment 4 of the present invention.

FIGS. 2 and 3 are charts showing various aberrations respectively of the embodiments 1 and 2, and FIGS. 5 and 6 are charts showing various aberrations respectively of the embodiments 3 and 4. These charts assume that the light enters from the screen side and indicate the aberrations on the face of the cathode ray tube. In said charts, symbols e, g and c respectively indicate e-line (λ=546.1 nm), g-line (λ=435.8 nm) and c-line (λ=656.3 nm) as the reference wavelengths. In the astigmatism, the broken line and solid line respectively indicate the meridional image plane and the sagittal image plane.

Comparison of the aberration charts indicates that the projection lens of the present invention has an excellent imaging performance, despite of a fact that it has a large aperture ratio and a wide image angle.

What is claimed is:

1. A projection lens for projecting the image of an object onto a screen, comprising in the order from the screen side:

a first lens group of a positive refractive power;

a cemented second lens group of a positive refractive power;

a third lens group of a negative refractive power; and a fourth lens group of a negative refractive power with a concave face at the screen side; wherein each of the first and third lens groups has at least an aspherical face, and the focal length f of the entire lens system, the focal length f1 of said first lens group and the focal length f3 of said third lens group satisfy following conditions:

0<f/f1<0.25

−0.1<f/f3<0.

2. A projection lens according to claim 1, wherein said 1st lens Group includes, in the order from the screen side, a positive meniscus-shaped 1st lens component convex to the screen, a negative meniscus-shaped 2nd lens component convex to the screen, and a meniscus-shaped aspherical plastic 3rd lens component convex to the screen, and further satisfies a following condition:

0<f/$f_{as1}$<0.25 wherein $f_{as1}$ is the paraxial focal length of said 3rd lens component.

3. A projection lens according to claim 2, further satisfying following conditions:

2<(RS+RA)/(RB−RA)<5

−5<(RD+RC)/(RD−RC)<−2 wherein RA and RB are radii of curvature respectively of a face closest to the screen and a face closest to the object of said 1st lens component in said 1st lens group, and RC and RD are those respectively of a face closest to the screen and a face closest to the object of said 2nd lens component.

4. A projection lens according to claim 2, satisfying a condition:

$0.1 < d_{L13}/D1 < 0.25$ wherein $d_{L13}$ is the axial thickness of the aspherical plastic component in said 1st lens group, and D1 is the axial thickness of said 1st lens group.

5. A projection lens according to claim 2, satisfying a condition:

$25 < v_{L11} - v_{L12} < 36$ wherein $v_{L11}$ is the Abbe's number, for the e-line ($\lambda = 546.1$ nm), of the positive meniscus 1st lens component convex to the screen in the 1st lens group, and $v_{L12}$ is the Abbe's number, to said e-line, of the negative meniscus 2nd lens component, convex to the screen, in the 1st lens group.

6. A projections lens according to claim 1, wherein said 2nd lens group includes a biconvex positive lens component and a negative meniscus lens component and further satisfying a following condition:

$0.5 < (N12-N11)/(N22-N21) < 1.2$ wherein N21 and N22 are refractive indexes respectively of said positive and negative lens components, and N11 and N12 are refractive indexes respectively of said 1st and 2nd lens components in said 1st lens group.

7. A projection lens according to claim 6, satisfying a condition:

$0.15 < d12/f < 0.4$ wherein d12 is the air gap between the 1st and 2nd lens groups, and f is the focal length of the entire lens system.

8. A projection lens according to claim 1, satisfying a condition:

$0.9 < D12/D24 < 1.5$ wherein $D_{12}$ is the axial distance from the top point of a lens face closest to the screen in said 1st lens group to the top point of a lens face closest to the screen in said 2nd lens group, and $D_{24}$ is the axial distance from the top point of a lens face closest to the object in the 2nd lens group to the top point of a lens face closest to the screen in the 4th lens group.

9. A projection lens for projecting the image of an object onto a screen, comprising in the order from the screen side:

a first lens group of a positive refractive power;

a second lens group of a positive refractive power;

a third lens group of a positive refractive power; and a fourth lens group of a negative refractive power;

wherein said first lens group includes, in the order from the screen side, a positive meniscus-shaped first lens component convex to the screen, a negative meniscus-shaped second lens component convex to the screen, and a meniscus-shaped aspherical plastic third lens component convex to the screen, and said projection lens satisfies following conditions:

$0 < f/f1 < 0.25$ $0 < f/f3 < 0.3$ $5 < (RB+RA)/(RB-RA) < 12$ $-7 < (RD+RC)/(RD-RC) < -5.1$ where f is the focal length of the entire lens system; f1 is the focal length of said first lens group; f3 is focal length of said third lens group; RA and RB are radii of curvature respectively of a face closest to the screen and a face closest to the object of said first lens component in said first lens group; and RC and RD are those respectively of a face closest to the screen and a face closest to the object of said second lens component.

10. A projection lens according to claim 9, satisfying a following condition:

$0 < f/f_{as1} < 0.25$ where $f/f_{as1}$ is the paraxial focal length of said third lens component.

11. A projection lens according to claim 10, satisfying a condition:

$0.1 < d_{L13}/D1 < 0.25$ wherein $d_{L13}$ is the axial thickness of the aspherical plastic component in said first lens group, and D1 is the axial thickness of said first lens group.

12. A projection lens according to claim 12, satisfying a condition:

$0.9 < D_{12}/D_{24} < 1.5$ wherein $D_{12}$ is the axial distance from the top point of a lens face closest to the screen in said first lens group to the top point of a lens face closest to the screen in said second lens group, and $D_{24}$ is the axial distance from the top point of a lens face closest to the object in the second lens group to the top point of a lens face closest to the screen in the fourth lens group.

13. A projection lens according to claim 12, satisfying a condition:

$0.15 < d12/f < 0.4$ wherein d12 is the air gap between the first and second lens groups, and f is the focal length of the entire lens system.

14. A projection lens according to claim 13, satisfying a condition:

$25 < v_{L11} - v_{L12} < 36$ wherein $v_{L11}$ is the Abbe's number, for the e-line ($\lambda = 546.1$ nm), of the positive meniscus first lens component convex to the screen in the first lens group, and $v_{L12}$ is the Abbe's number, to said e-line, of the negative meniscus second lens group component, convex to the screen, in the first lens group.

15. A projection lens according to claim 14, wherein said second lens group is composed of a cemented lens consisting of a positive lens and a negative lens, and satisfies a condition:

$n_{L22} 1 n_{L21} > 0.15$ wherein $n_{L21}$ and $n_{L22}$ are refractive indexes, to the e-line ($\lambda = 546.1$ nm), respectively of said positive lens and negative lens.

16. A projection lens for projecting the image of an object onto a screen, comprising in the order from the screen side:

a first lens group of a positive refractive power including, in the order from the screen side, a positive meniscus-shaped first lens component convex to the screen, a negative meniscus-shaped second lens component convex to the screen, and a meniscus-shaped aspherical plastic third lens component convex to the screen;

a cemented second lens group of a positive refractive power including a biconvex-shaped positive lens component and a meniscus-shaped negative lens component;

a third lens group of a negative refractive power, being composed of a single lens; and a fourth lens group of a negative refractive power, having a concave face at the screen side;

wherein each of said first and third lens groups has at least one aspherical face.

* * * * *